(12) United States Patent
Ito et al.

(10) Patent No.: US 8,741,414 B2
(45) Date of Patent: Jun. 3, 2014

(54) SHEET FOR PRODUCING A MULTILAYER OPTICAL RECORDING MEDIUM AND MULTILAYER OPTICAL RECORDING MEDIUM

(75) Inventors: Masaharu Ito, Kawaguchi (JP); Yuta Suzuki, Saitama (JP); Takuzo Watanabe, Suginami-ku (JP); Takeshi Kondo, Saitama (JP)

(73) Assignee: LINTEC Corporation, Tokyo (JP)

( * ) Notice: Subject to any disclaimer, the term of this patent is extended or adjusted under 35 U.S.C. 154(b) by 768 days.

(21) Appl. No.: 12/897,597

(22) Filed: Oct. 4, 2010

(65) Prior Publication Data

US 2011/0080824 A1    Apr. 7, 2011

(30) Foreign Application Priority Data

Oct. 6, 2009  (JP) .................................. 2009-232193

(51) Int. Cl.
*G11B 7/24*      (2013.01)
*G11B 7/24024*   (2013.01)
*G11B 7/24038*   (2013.01)
*B32B 37/12*     (2006.01)

(52) U.S. Cl.
CPC ........ *G11B 7/24024* (2013.01); *G11B 7/24038* (2013.01); *B32B 37/12* (2013.01)
USPC ........................... 428/64.4; 156/289; 156/328

(58) Field of Classification Search
CPC . G11B 7/24024; G11B 7/24038; B32B 37/12
USPC .................. 428/64.4; 156/289, 328
See application file for complete search history.

(56) References Cited

U.S. PATENT DOCUMENTS 8,273,437 B2 *  9/2012  Nakabayashi ............... 428/64.1
2005/0142318 A1  6/2005  Nakabayashi et al.

FOREIGN PATENT DOCUMENTS

| JP | 11-250496 A | 9/1999 |
| JP | 2002-050053 A | 2/2002 |
| JP | 2004-259369 A | 9/2004 |
| JP | 2005-209328 A | 8/2005 |
| JP | 2008-282650 A | 10/2008 |
| WO | WO 2009/066414 A1 | 5/2009 |

OTHER PUBLICATIONS

Japanese Office Action (Notice of Reasons for Rejection) mailed Dec. 4, 2012 for JP 2009-232193.
Y. Kawata, et al, Differential phase-contrast microscope with a split detector for the readout system of a multilayered optical memory, Applied Optics, May 10, 1996, vol. 35, No. 14, pp. 2466-2470.
Japanese Office Action dated Dec. 20, 2013 in Japanese Application No. 2013-037949.

* cited by examiner

*Primary Examiner* — Elizabeth Mulvaney
(74) *Attorney, Agent, or Firm* — Holtz Holtz Goodman & Chick PC (57) ABSTRACT

A sheet for producing a multilayer optical recording medium having a repeated structure in which a plurality of optical recording layers are laminated, wherein the sheet has a structure such that a unit comprising at least a release assisting layer, an optical recording layer having a thickness of 1 to 1,000 nm and a pressure sensitive adhesive layer are disposed on a process film, the release assisting layer is disposed on the surface of the process film, and a pressure sensitive adhesive layer is disposed as the outermost layer, and an absolute value of difference between refractive indices of the release assisting layer and the pressure sensitive adhesive layer at a wavelength of 660 nm is 0.11 or smaller; and a multilayer optical recording medium obtained by using the sheet. The sheet enables to release the process film and transfer the optical recording layer while the condition of the surface of the optical recording layer is kept excellent. The multilayer optical recording medium has a great recording density and exhibits excellent property for recording.

20 Claims, 2 Drawing Sheets

SHEET FOR PRODUCING A MULTILAYER OPTICAL RECORDING MEDIUM AND MULTILAYER OPTICAL RECORDING MEDIUM

TECHNICAL FIELD

The present invention relates to a sheet for producing a multilayer optical recording medium and a multilayer optical recording medium and, more particularly, to a sheet for producing a multilayer optical recording medium which enables to easily produce a multilayer optical recording medium having a great recording density and exhibiting excellent property for recording, and a multilayer optical recording medium produced by using the sheet.

BACKGROUND ART

Recently, optical recording media are attracting attention since a great amount of information can be recorded and are used in various applications. Methods for three dimensionally recording data (hereinafter, referred to as "a multilayer optical recording method, occasionally") are proposed to further increase the recording density. For example, Y. Kawata et al. reported a technology in which multilayer optical recording is conducted on a photopolymer material comprising a photoreactive component in the photopolymerization (for example, refer to Non-Patent Reference 1). However, heretofore, the multilayer optical recording medium for conducting the multilayer optical recording has a problem in that crosstalk of data takes place during multilayer recording and reading. As the method for preventing the crosstalk, the distance between layers in the optical recording medium may be increased. In this case, it is inevitable that the recording density is decreased, and a problem arises in that the number of the optical recording layer is inevitably limited since light used for reading and writing the record is absorbed in the passage.

To decrease the crosstalk described above, an optical recording medium having two or more recording layers in which a non-recording layer comprising a material not allowing recording of optical informations with the light for recording is disposed partially or entirely between layers of the two or more recording layers described above is proposed (for example, refer to Patent Reference 1). For the formation of the recording layer and the non-recording layer constituting the optical recording medium, in general, each layer is formed in accordance with the spin coating process to laminate the layers. However, the lamination in accordance with the spin coating process has problems in that formation of layers having a great area is difficult, productivity is small, and accuracy of the thickness of each layer and the entire layer is small.

As a means for overcoming the above problems, a process in which a multilayer structural material is obtained by successively laminating a sheet material in which an optical recording layer comprising a photosensitive material and a pressure sensitive adhesive layer are laminated, is proposed (for example, refer to Patent Reference 2). The multilayer optical recording medium having the multilayer structural material described above has excellent accuracy of thickness with respect to each layer and the entire medium, and a medium having a great area can be produced. However, when it is desired that the thickness of the optical recording layer is decreased (to 1,000 nm or smaller) in the process using a sheet utilizing a pressure sensitive adhesive, a problem arises in that strength of the optical recording layer is decreased, and the optical recording medium is occasionally broken when the process film is removed. When the amount of the matrix material (the binder) in the optical recording layer is increased to increase the strength, a problem arise in that recording sensitivity of the optical recording layer is decreased although the removal is made possible.

[Patent Reference 1] Japanese Patent Application Laid-Open No, Heisei 11 (1999)-250496
[Patent Reference 2] Japanese Patent Application Laid-Open No. 2005-209328
[Non-Patent Reference 1] Appl. Opt., 35, 2466 (1966)

DISCLOSURE OF THE INVENTION

Problems to be Resolved by the Invention

The present invention has been made under the above circumstances and has an object of providing a sheet for producing a multilayer optical recording medium which enables to easily release a process film from an optical recording layer and transfer the optical recording layer and a multilayer optical recording medium which is obtained by using the sheet, has a great recording density and exhibits excellent property for recording.

Means for Overcoming the Problems

As the result of intensive studies by the present inventors to achieve the above object, it was found that the object could be achieved with a sheet for producing a multilayer optical recording medium having a structure such that a unit comprising at least a release assisting layer, an optical recording layer and a pressure sensitive adhesive layer are disposed on a process film, a release assisting layer is disposed on the surface of the process film, and a pressure sensitive adhesive layer is disposed as the outermost layer, and the absolute value of a difference between refractive indices of the release assisting layer and the pressure sensitive adhesive layer at a wavelength of 660 nm is a specific value or smaller. The present invention has been completed based on the knowledge.

The present invention provides:
(1) A sheet for producing a multilayer optical recording medium having a repeated structure in which a plurality of optical recording layers are laminated, wherein the sheet has a structure such that a unit comprising at least a release assisting layer, an optical recording layer having a thickness of 1 to 1,000 nm and a pressure sensitive adhesive layer of are disposed on a process film, a release assisting layer is disposed on a surface of the process film, and a pressure sensitive adhesive layer is disposed as an outermost layer, and an absolute value of difference between refractive indices of the release assisting layer and the pressure sensitive adhesive layer at a wavelength of 660 nm is 0.11 or smaller;
(2) The sheet for producing a multilayer optical recording medium described in (1), wherein an absolute value of difference between refractive indices of the release assisting layer and the pressure sensitive adhesive layer at a wavelength of 405 nm is 0.11 or smaller;
(3) The sheet for producing a multilayer optical recording medium described in any one of (1) and (2), wherein a refractive index of the release assisting layer at a wavelength of 660 nm is 1.42 to 1.60;
(4) The sheet for producing a multilayer optical recording medium described in any one of (1) to (3), wherein the unit comprising at least a release assisting layer, an optical recording layer and a pressure sensitive adhesive layer has a structure such that a release assisting layer, an optical recording layer, a release assisting layer, an optical recording layer and a pressure sensitive adhesive layer are successively laminated on a process film;

(5) The sheet for producing a multilayer optical recording medium described in any one of (1) to (4), wherein a material constituting the release assisting layer comprises a cured product of an energy curable compound;

(6) The sheet for producing a multilayer optical recording medium described in any one of (1) to (4), wherein a material constituting the release assisting layer comprises a cellulose-based resin;

(7) The sheet for producing a multilayer optical recording medium described in any one of (1) to (5), wherein the material constituting the release assisting layer comprises fluorine atom;

(8) The sheet for producing a multilayer optical recording medium described in any one of (1) to (7), wherein the optical recording layer comprises a multi-photon absorbing material;

(9) A multilayer optical recording medium, which comprises the sheet for producing a multilayer optical recording medium according to any one of (1) to (8).

The Effect of the Invention

In accordance with the present invention, a sheet for producing a multilayer optical recording medium which enables to easily produce a multilayer optical recording medium having an optical recording layer having a thickness of 1,000 nm or smaller, and a multilayer optical recording medium which exhibits a sufficiently great intensity of light reflected at deep portions, provides a great recording density and exhibits excellent property for recording, can be provided.

| In the Figures, reference numerals mean as follows: | |
| --- | --- |
| 1, 1a, 1b, 1-1, 1-2, 1-3 and 1-n: | optical recording layers |
| 2, 2a, 2b, 2-1, 2-2, 2-3 and 2-n: | layers supporting release |
| 3, 3a, 3b, 3-1, 3-2, 3-3 and 3-n: | layers of a pressure sensitive adhesive |
| 4: | a process film |
| 5: | a release film |
| 6: | a substrate |
| 7: | a protective film |
| 15: | a sheet for producing a multilayer optical recording medium |
| 20: | a sheet for producing a multilayer optical recording medium |
| 30: | a multilayer optical recording medium |

THE MOST PREFERRED EMBODIMENT TO CARRY OUT THE INVENTION

The sheet for producing a multilayer optical recording medium of the present invention will be described in the following.

The sheet for producing a multilayer optical recording medium of the present invention (hereinafter, referred to simply as a "sheet for producing a recording medium", occasionally) is a sheet for producing a multilayer optical recording medium having a repeated structure in which a plurality of optical recording layers are laminated, wherein the sheet has a structure such that a unit comprising at least a release assisting layer, an optical recording layer having a thickness of 1 to 1,000 nm and a pressure sensitive adhesive layer are disposed on a process film, a release assisting layer is disposed on the surface of the process film, and a pressure sensitive adhesive layer is disposed as the outermost layer.

[Process Film]

The process film in the sheet for producing a multilayer optical recording medium of the present invention exhibits the property of being released from the release assisting layer formed on the process film. As the process film, any film can be used as long as the film exhibits the property of being released from the release assisting layer, and films of various types of synthetic resins can be used. Examples of the process film include films of various types of polyester such as polyethylene terephthalate, polybutylene terephthalate and polyethylene naphthalate, polyethylene films, polypropylene films, polyvinyl chloride films, polyvinylidene chloride films, polyvinyl alcohol films, ethylene-vinyl acetate copolymer films, polystyrene films, polycarbonate films, polymethylpentene films, polysulfone films, polyether ether ketone films, polyether sulfone films, polyphenylene sulfide films, polyether imide films, polyimide films, fluororesin films, polyamide films, acrylic resin films, norbornene-based resin films, cycloolefin resin films and acetylcellulose resin films. The thickness of the process film is not particularly limited. The thickness is, in general, 5 to 500 μm and preferably 10 to 200 μm.

The process film may have a releasing treatment on the face having the release assisting layer. Examples of the releasing treatment include treatments of coating the film with a conventional releasing agent such as a silicone-based releasing agent, a polybutadiene-based releasing agent, a fluororesin-based releasing agent and an alkyd-based releasing agent. The thickness of the layer of a releasing agent obtained by the coating with the releasing agent is not particularly limited and can be set as desired. In general, the thickness is 0.05 to 50 μm. The film before being coated with the releasing agent may be subjected, for example, to the treatment by corona discharge, the treatment by plasma discharge, the treatment with chromic acid, the treatment with flame, the treatment with the heated air or the treatment with ozone and irradiation with ultraviolet light.

It is preferable that the peel strength of the process film is 10 to 700 mN/25 mm. When the peel strength is within this range, workability of transfer of the unit comprising the release assisting layer and the optical recording layer disposed on the process film is excellent. It is more preferable that the peel strength is 30 to 500 mN/25 mm.

It is preferable that the face of the process film on which the release assisting layer is formed comprises no fillers. The method of measurement of the peel strength described above will be described below.

[Release Assisting Layer]

In the sheet for producing a recording medium of the present invention, the release assisting layer laminated to the process film is a layer released from the process film in combination with the optical recording layer and exhibits the effect of reinforcing the extremely thin optical recording layer (a thickness of 1 to 100 nm). The optical recording layer can be easily released by using the release assisting layer.

The material for the release assisting layer described above is not particularly limited as long as the material is transparent, can effectively exhibit the releasing property and the reinforcing property described above and does not adversely affect the optical properties of the sheet for producing a recording medium of the present invention. As the material described above, resin materials, examples of which include cured products of the energy curable compound (energy cured resins), cellulose-based resins such as triacetylcellulose, polycarbonate resins, cycloolefin-based resins, modified acrylic resins, polyvinyl alcohol, polyvinyl acetal, polystyrene, polyimides, polyether imides, polysulfones, polyether sulfones, polyarylates and polyesters, are preferable. The energy curable compound means a compound which can be cured by irradiation with an energy ray or by heating.

(Energy Curable Compound)

Examples of the energy curable compound used as the raw material for the energy cured resin described above include oligomers and monomers curable with energy, oligomers and monomers curable with heat and polymers obtained by introducing a functional group curable with energy having a polymerizable double bond into side chains.

<Oligomer Curable with Energy>

Examples of the oligomer curable with energy include oligomers such as polyester acrylate-based oligomers, epoxy acrylate-based oligomers, urethane acrylate-based oligomers, polyether acrylate-based oligomers, polybutadiene acrylate-based oligomers and silicone acrylate-based oligomers. The polyester acrylate-based oligomer can be obtained, for example, by obtaining a polyester oligomer having hydroxyl group at both ends by condensation of a polybasic carboxylic acid and a polyhydric alcohol, followed by esterification of hydroxyl groups in the obtained polyester with (meth)acrylic acid, or by obtaining an oligomer by addition of an alkylene oxide to a polybasic carboxylic acid, followed by esterification of hydroxyl groups at the ends of the obtained oligomer with (meth)acrylic acid. The epoxy acrylate-based oligomer can be obtained, for example, by esterification of oxirane ring in an epoxy resin of the bisphenol type or an epoxy resin of the novolak type having a relatively low molecular weight by the reaction with (meth)acrylic acid. Epoxy acrylate-based oligomers of the carboxyl modification type which are obtained by partial modification of the epoxy acrylate-based oligomer with an anhydride of a dibasic carboxylic acid can also be used. The urethane acrylate-based oligomer can be obtained, for example, by obtaining a polyurethane oligomer by the reaction of a polyether polyol or a polyester polyol with a polyisocyanate, followed by esterification of the obtained polyurethane oligomer with (meth) acrylic acid. The polyol acrylate-based oligomer can be obtained, for example, by esterification of hydroxyl group in a polyether polyol with (meth)acrylic acid.

It is preferable that the weight-average molecular weight of the polymerizable oligomer is selected in the range of 500 to 100,000, more preferably in the range of 1,000 to 70,000 and most preferably in the range of 3,000 to 40,000 as obtained by the measurement in accordance with the gel permeation chromatography (GPC) and expressed as the value of the corresponding polystyrene used as the reference material. The oligomer may be used singly or in combination of two or more.

<Monomer Curable with Energy>

Examples of the monomer curable with energy include monofunctional (meth)acrylates such as cyclohexyl (meth) acrylate, 2-ethylhexyl (meth)acrylate, lauryl (meth)acrylate, stearyl (meth)acrylate and isobornyl (meth)acrylate; 1,4-butanediol di(meth)acrylate, 1,6-hexanediol di(meth)acrylate, 1,9-nonanediol di(meth)acrylate, 1,10-decanediol di(meth) acrylate, neopentyl glycol di(meth)acrylate, polyethylene glycol di(meth)acrylate, neopentyl glycol adipate di(meth) acrylate, neopentyl glycol hydroxypivalate di(meth)acrylate, dicyclopentanyl di(meth)acrylate, dicyclopentenyl di(meth) acrylate modified with caprolactone, phosphoric acid di(meth)acrylate modified with ethylene oxide, cyclohexyl di(meth)acrylate modified with allyl group, isocyanurate di(meth)acrylate, trimethylolpropane tri(meth)acrylate, dipentaerythritol tri(meth)acrylate, dipentaerythritol tri (meth)acrylate modified with propionic acid, pentaerythritol tri(meth)acrylate, trimethylolpropane tri(meth)acrylate modified with propylene oxide, tris(acryloxyethyl) isocyanurate, dipentaerythritol penta(meth)acrylate modified with propionic acid, dipentaerythritol hexa(meth)acrylate, dipentaerythritol hexa(meth)acrylate modified with caprolactone, trifluoroethyl (meth)acrylate, tetrafluoropropyl (meth)acrylate and octafluoropentyl (meth)acrylate. The above monomer may be used singly or in combination of two or more.

<Polymer Curable with Energy Having Polymerizable Double Bond in Side Chains>

Examples of the polymer curable with energy having polymerizable double bond in side chains include polymers obtained by introducing an active point such as —COOH, —NCO, epoxy group, —OH and —NH$_2$ into the polymer chain of an acrylic polymer comprising a (meth)acrylic acid ester as the main component of the constituting units, followed by bringing the active point into reaction with a compound having a polymerizable double bond to introduce a functional group curable with energy having a polymerizable double bond into the side chain of the acrylic polymer. For introducing the active point described above into the acrylic polymer, a monomer or an oligomer having a functional group such as —COOH, —NCO, epoxy group, —OH and —NH$_2$ and a polymerizable double bond is made present in a reaction system when the acrylic polymer is produced.

Specifically, when the acrylic polymer described above is produced, (meth)acrylic acid or the like is used for introducing —COOH, (meth)acryloxyethyl isocyanate or the like is used for introducing —NCO, glycidyl (meth)acrylate or the like is used for introducing epoxy group, 2-hydroxyethyl (meth)acrylate, 1,6-hexanediol mono(meth)acrylate or the like is used for introducing —OH, and (meth)acrylamide or the like is used for introducing —NH$_2$.

As the compound having a polymerizable double bond which is brought into reaction with the active point, a compound can be suitably selected, for example, from (meth) acryloxyethyl isocyanate, glycidyl (meth)acrylate, pentaerythritol mono(meth)acrylate, dipentaerythritol mono (meth)acrylate and trimethylolpropane mono(meth)acrylate in accordance with the type of the active point.

<Polymerization Initiator>

For curing the energy curable compound described above, a polymerization initiator may be used, where desired. As the polymerization initiator, an organic peroxide or an azo-based compound is used when the energy curable compound is a compound curable with heat. Examples of the organic peroxide include dialkyl peroxides such as di-t-butyl peroxide, t-butyl cumyl peroxide and dicumyl peroxide; diacyl peroxides such as acetyl peroxide, lauroyl peroxide and benzoyl peroxide; ketone peroxides such as methyl ethyl ketone peroxide, cyclohexanone peroxide, 3,3,5-trimethylcyclohexanone peroxide and methylcyclohexanone peroxide; peroxyketals such as 1,1-bis(t-butyl-peroxy)cyclohexane; hydroperoxides such as t-butyl hydroperoxide, cumene hydroperoxide, 1,1,3,3-tetramethylbutyl hydroperoxide, p-menthane hydroperoxide, diisopropylbenzene hydroperoxide and 2,5-dimethylhexane 2,5-dihydroperoxide; and peroxyesters such as t-butyl peroxyacetate, t-butyl peroxy-2-ethylhexanoate, t-butyl peroxybenzoate and t-butyl peroxyisopropyl carbonate. Examples of the azo-based compound include 2,2'-azobis-(4-methoxy-2,4-dimethylvaleronitrile), 2,2'-azobis(2-cyclopropylpropionitrile), 2,2'-azobis(2,4-dimethylvaleronitrile), azobisisobutyronitrile, 2,2'-azobis(2-methylbutyronitrile), 1,1-azobis(cyclohexane-1-carbonitrile), 2-(carbamoylazo)isobutyronitrile and 2-phenylazo-4-methoxy-2,4-dimethylvaleronitrile. The polymerization initiator may be used singly or in combination of two or more.

When the energy curable compound is a compound curable with energy ray, in general, ultraviolet light or electron beams are used for the irradiation. When the compound is irradiated with ultraviolet light, a photopolymerization initiator can be used as the polymerization initiator. Examples of the photopolymerization initiator include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenyl-acetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholinopropan-1-one, 4-(2-hydroxyethoxy)-phenyl 2-(hydroxy-2-propyl) ketone, benzophenone, p-phenylbenzo-phenone, 4,4'-diethylaminobenzophenone, dichlorobenzophenone, 2-methylanthraquinone, 2-ethylanthraquinone, 2-tertiary-butylanthra-quinone, 2-aminoanthraquinone, 2-methylthioxanthone, 2-ethylthio-xanthone, 2-chlorothioxanthone, 2,4-dimethylthioxanthone, 2,4-diethyl-thioxanthone, benzyl dimethyl ketal, acetophenone dimethyl ketal, p-dimethylamine benzoic acid ester and oligo[2-hydroxy-2-methyl-1-[4-(1-propenyl)phenyl]propane]. The above compound may be used singly or in combination of two or more.

(Energy Cured Resin)

An energy cured resin comprising a cured product of the energy curable compound described above can be obtained by adding the polymerization initiator described above, crosslinking agents, tackifiers, antioxidants, ultraviolet light absorbers, light stabilizers, softeners and fillers to the energy curable compound as desired, followed by curing the resultant mixture.

As the material constituting the release assisting layer described above, cured products of the oligomers curable with energy and the monomers curable with energy and triacetyl cellulose exhibiting excellent solvent resistance are preferable since an optical recording layer can be formed by coating the release assisting layer with a solution of an optical recording material when the optical recording layer is laminated on the release assisting layer. Among the above materials, cured products of the oligomers curable with energy and the monomers curable with energy are more preferable since the adjustment of the refractive index can be facilitated. It is preferable that the resin material described above has a glass transition temperature of 50° C. or higher from the standpoint of the releasing property, the reinforcing effect and the reliability as the optical recording medium. It is preferable that the thickness of the release assisting layer is 0.2 to 25 μm, more preferably 0.3 to 23 μm and most preferably 0.4 to 20 μm from the standpoint of exhibiting the releasing effect and the reinforcing effect, effectively releasing the optical recording layer and obtaining the practical recording density.

As the material constituting the release assisting layer described above, materials comprising fluorine atom is preferable since it is necessary in the present invention that the absolute value of the difference between refractive indices of the release assisting layer and the pressure sensitive adhesive layer at the wavelength of 660 nm be 0.11 or smaller as described below. Examples of the material comprising fluorine atom include cured products of trifluoroethyl (meth)acrylate, tetrafluoropropyl (meth)acrylate and octafluoropentyl (meth)acrylate and copolymers of vinyl polyfluorides. The release assisting layer can be formed by applying a coating fluid comprising the material described above in accordance with a coating process such as the bar coating process, the reverse roll coating process, the knife coating process, the roll knife coating process, the gravure coating process, the air doctor coating process and the doctor blade coating process, followed by drying the formed coating layer by heating at a temperature of about 80 to 150° C. for several tens seconds to several minutes, where desired.

The release assisting layer may be subjected to a surface treatment to improve adhesion with the optical recording layer formed on the release assisting layer, where desired. Examples of the surface treatment include the treatment by corona discharge, the treatment with plasma, the treatment with chromic acid (a wet process), the treatment with flame, the treatment with the heated air and the treatment with ozone and irradiation with ultraviolet light. In general, the treatment by corona discharge is preferable from the standpoint of the effect and the operability although the surface treatment is suitably selected in accordance with the type of the release assisting layer.

[Optical Recording Layer]

For the optical recording layer in the sheet for producing a multilayer optical recording medium of the present invention, a material can be suitably selected as desired from materials conventionally used as the material constituting an optical recording layer. From the standpoint of improving the recording density, it is preferable that the optical recording layer comprises a multiphoton absorbing material. The multiphoton absorbing material means a compound having the property such that the compound absorbs at least two photons simultaneously and is converted into an excited state. From the standpoint of obtaining the practically sufficient recording sensitivity, materials comprising a material absorbing two photons which has a sectional area of two photon absorption of 0.1 GM or greater are preferable, and materials comprising a material absorbing two photons which has a sectional area of two photon absorption of 100 GM or greater are more preferable among the materials exhibiting the above property. The material described above may be, for example, a material constituted with the multiphoton absorbing material alone, a material constituted with the multiphoton absorbing material and other reactive compounds which is changed by the energy transfer from the excited multiphoton absorbing material or, where necessary, a material obtained by mixing the above compounds into a matrix.

"GM" described above means $10^{-50}$ $cm^4 \cdot s \cdot molecule^{-1} \cdot photon^{-1}$. Although the material constituting the matrix described above may be an inorganic material or an organic material, an organic macromolecular material is preferable since production of the sheet for producing a recording medium of the present invention is easy and the material can be selected from variety of materials. The macromolecular material may be a homopolymer or a copolymer. The type of the monomer, the molecular weight and the form of polymerization are not particularly limited. Examples of the macromolecular material include polymethyl methacrylate.

The multiphoton absorbing material may be a material chemically bonded to the matrix as a component of the main chain or side chains or a material dispersed or dissolved in the matrix. The multiphoton absorbing material is not particularly limited, and various compounds can be used. Examples of the multiphoton absorbing material include compounds such as cyanine coloring agents, styryl coloring agents, pyrilium coloring agents, thiapyrilium coloring agents, melocyanine coloring agents, arylidene coloring agents, oxonol coloring agents, squalium coloring agents, azulenium coloring agents, coumarine coloring agents, pyran coloring agents, quinone coloring agents, anthraquinone coloring agents, triphenylmethane coloring agents, diphenylmethane coloring agents, xanthene coloring agents, thioxanthene coloring agents, phenothiazine coloring agents, azo coloring agents, azomethine coloring agents, fluorenone coloring agents, diarylethene coloring agents, spiropyran coloring agents, fulguide coloring agents, perylene coloring agents, polyene coloring agents, diphenylamine coloring agents, quinacridone coloring agents, porphyrin coloring agents, phthalocyanine coloring agents, styrene-based coloring agents, phenylenevinylene coloring agents, triphenylamine-based coloring agents and carbazole-based coloring agents.

Examples of the method of recording using the multiphoton absorbing material include a method in which modulation in the refractive index is read using a material isomerized with light such as compounds having azo group, C=C group or C=N group, a material polymerized with light such as (meth)acrylate compounds, a material having a structure reversibly changing with light such as organic photochromic materials or an organic refractive material forming charge distribution with light; a method in which fluorescent light is read using a material having the fluorescent property changing with light; and a method in which modulation of absorption or modulation of refractive index is read using a combination of a material generating an acid with light and a coloring agent developing color with an acid or a combination of an agent erasing color and a coloring agent which allows erasure of the color. In the above recording methods, the multiphoton absorbing compound itself may have the photoreactivity described above or the reaction may be induced by energy transfer from the multiphoton absorbing compound excited by multiphoton absorption to another reactive material.

In the sheet for producing an optical recording medium of the present invention, the thickness of the optical recording layer described above is 1 to 1,000 nm and preferably 10 to 800 nm.

[Layer of a Pressure Sensitive Adhesive]

In the sheet for producing an optical recording medium of the present invention, a pressure sensitive adhesive layer exhibiting the adhesive property at the ordinary temperature is disposed as the outermost layer. The multilayer optical recording medium can be easily produced since the sheet for producing an optical recording medium is provided with the pressure sensitive adhesive layer. As the pressure sensitive adhesive constituting the pressure sensitive adhesive layer, acrylic pressure sensitive adhesives are preferable due to the excellent transparency.

As the acrylic pressure sensitive adhesive, for example, pressure sensitive adhesives comprising a (meth)acrylic acid ester-based copolymer and a crosslinking agent can be used.

((Meth)Acrylic Acid Ester-Based Copolymer)

As the (meth)acrylic acid ester-based copolymer, copolymers of a (meth)acrylic acid ester in which the alkyl group bonded to non-carbonyl oxygen atom in the ester portion has 1 to 20 carbon atoms with a monomer having a functional group having active hydrogen and other monomers which are used where desired are preferable.

Examples of the (meth)acrylic acid esters in which the alkyl group bonded to non-carbonyl oxygen atom in the ester portion has 1 to 20 carbon atoms include methyl (meth)acrylate, ethyl (meth)acrylate, propyl (meth)acrylate, isopropyl (meth)acrylate, n-butyl (meth)acrylate, isobutyl (meth)acrylate, t-butyl (meth)acrylate, pentyl (meth)acrylate, hexyl (meth)acrylate, cyclohexyl (meth)acrylate, 2-ethylhexyl (meth)acrylate, isooctyl (meth)acrylate, decyl (meth)acrylate, dodecyl (meth)acrylate, myristyl (meth)acrylate, palmityl (meth)acrylate and stearyl (meth)acrylate. The above (meth)acrylic acid ester may be used singly or in combination of two or more.

Examples of the monomer having a functional group having active hydrogen include hydroxyalkyl (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate and 4-hydroxybutyl (meth)acrylate; monoalkylaminoalkyl (meth)acrylates such as monomethylaminoethyl (meth)acrylate, monoethylaminoethyl (meth)acrylate, monomethylaminopropyl (meth)acrylate and monoethyl-aminopropyl (meth)acrylate; and ethylenically unsaturated carboxylic acids such as acrylic acid, methacrylic acid, crotonic acid, maleic acid, itaconic acid and citraconic acid. The above monomer may be used singly or in combination of two or more.

Examples of the other monomer which is used where desired include vinyl esters such as vinyl acetate and vinyl propionate; olefins such as ethylene, propylene and isobutylene; halogenated olefins such as vinyl chloride and vinylidene chloride; styrene-based monomers such as styrene and α-methylstyrene; diene-based monomers such as butadiene, isoprene and chloroprene; nitrile-based monomers such as acrylonitrile and methacrylonitrile; acrylamides such as acrylamide, N-methyl-acrylamide and N,N-dimethylacrylamide; phenoxyethyl (meth)acrylate; phenoxydiethylene glycol (meth)acrylate; phenoxypolyethylene glycol (meth)acrylate; o-phenylphenol (meth)acrylate modified with hydroxyethyl group; isobornyl (meth)acrylate; and benzyl (meth)acrylate. The above monomer may be used singly or in combination of two or more.

The form of copolymerization of the (meth)acrylic acid ester-based copolymer is not particularly limited and may be any of a random copolymer, a block copolymer and a graft copolymer. It is preferable that the molecular weight is in the range of 300,000 to 2,000,000 as the weight-average molecular weight. The weight-average molecular weight described above is the value obtained by the measurement in accordance with the gel permeation chromatography (GPC) and expressed as the value of the corresponding polystyrene. In the present invention, the (meth)acrylic acid ester-based copolymer may be used singly or in combination of two or more.

(Crosslinking Agent)

The crosslinking agent in the acrylic pressure sensitive adhesive is not particularly limited, and a crosslinking agent can be suitably selected as desired from conventional crosslinking agents used for acrylic pressure sensitive adhesives. Examples of the crosslinking agent include polyisocyanate compounds, epoxy compounds, aziridine-based compounds, melamine resins, urea resins, dialdehydes, metal chelate compounds, metal alkoxides and metal salts. Among these crosslinking agents, alicyclic polyisocyanate-based compounds, aliphatic polyisocyanate-based compounds, xylene-based polyisocyanate-based compounds, alicyclic epoxy-based compounds, aliphatic epoxy-based compounds, metal chelate compounds and aliphatic aziridine-based compounds are preferable since change in the transmittance of light due to change in the color (yellowing) of the pressure sensitive adhesive layer is suppressed, and degradation due to irradiation with laser during recording and reading is suppressed.

<Alicyclic and Aliphatic Polyisocyanate-Based Compound>

Examples of the alicyclic polyisocyanate compound include isophorone diisocyanate, bicycloheptane triisocyanate, cyclopentylene diisocyanate, cyclohexylene diisocyanate, methylcyclohexylene diisocyanate, hydrogenated diphenylmethane diisocyanate, biuret compounds and isocyanurate compounds based on these polyisocyanates, and adducts as the reaction products with low molecular weight compounds having active hydrogen such as ethylene glycol, propylene glycol, neopentyl glycol, trimethylolpropane and castor oil. Examples of the aliphatic polyisocyanate-based compound include hexamethylene diisocyanate, trimethylhexamethylene diisocyanate, lysine diisocyanate, biuret compounds and isocyanurate compounds based on these polyisocyanates, and adducts as the reaction products with low molecular weight compounds having active hydrogen such as ethylene glycol, propylene glycol, neopentyl glycol, trimethylolpropane and castor oil.

<Alicyclic and Aliphatic Epoxy-Based Compound>

Examples of the alicyclic epoxy-based compound include 3,4-epoxycyclohexylmethyl 3,4-epoxycylohexylcarboxylate, 1,3-bis(N,N'-diglycidylaminomethyl)cyclohexane and hydrogenated bisphenol A diglycidyl ether. Examples of the aliphatic epoxy-based compound include polyethylene glycol diglycidyl ether, polypropylene glycol diglycidyl ether, 1,6-hexanediol glycidyl ester, adipic acid glycidyl ester and sebacic acid glycidyl ester.

<Metal Chelate Compound>

Examples of the metal chelate compound include chelate compounds in which the metal atom is aluminum, zirconium, titanium, zinc, iron or tin. Aluminum chelate compounds are preferable.

Examples of the aluminum chelate compound include diisopropoxy-aluminum monooleyl acetoacetate, monoisopropoxyaluminum bisoleyl acetoacetate, monoisopropoxyaluminum monooleate monoethyl acetoacetate, diisopropoxyaluminum monolauryl acetoacetate, diisopropoxyaluminum monostearyl acetoacetate, diisopropoxyaluminum monoisostearyl acetoacetate, monoisopropoxyaluminum mono-N-lauroyl-β-alanate monolauryl acetoacetate, aluminum trisacetylacetonate, monoacetylacetonatoaluminum bis(isobutyl acetoacetate) chelate, monoacetylacetonatoaluminum bis(2-ethylhexyl acetoacetate) chelate, monoacetylacetonatoaluminum bis(dodecyl acetoacetate) chelate and monoacetylacetonatoaluminum bis(oleyl acetoacetate) chelate.

Examples of the aliphatic aziridine-based compound include trimethylolpropane tri(2-methyl-1-aziridinepropionate), tetramethylol-methane tri-β-aziridinylpropionate, 2,2'-bishydroxymethylbutanol tris[3-(1-aziridinyl)propionate] and 1,6-hexamethylenediethyleneurea.

In the pressure sensitive adhesive in the present invention, the crosslinking agent may be used singly or in combination of two or more. The content is selected, in general, in the range of 0.01 to 5.0 parts by mass, preferably in the range of 0.05 to 3.0 parts by mass and more preferably in the range of 0.1 to 1.0 part by mass based on 100 parts by mass of the (meth)acrylic acid ester-based copolymer described above from the standpoint of the properties as the pressure sensitive adhesive.

To the pressure sensitive adhesive, tackifiers, antioxidants, ultraviolet light absorbers, light stabilizers, softeners and fillers may be added where desired as long as the effect of the present invention is not adversely affected.

The thickness of the pressure sensitive adhesive layer in the sheet of the present invention is not particularly limited. The thickness is, in general, about 1 to 100 μM and preferably 1 to 30 μm.

[Difference Between Refractive Indices of a 1 Release Assisting Layer and a Pressure Sensitive Adhesive Layer]

In the multilayer optical recording medium comprising a recording layer and non-recording layers (a release assisting layer and a pressure sensitive adhesive layer), the focus servo used for recording utilizes the light reflected at the interface of the laminated layers. When the difference between the refractive indices of the recording layer and the non-recording layers is great, the intensity of the reflected light is great, and the intensity of light is small when the difference is small. The working of the focus servo at the interface is easier when the intensity of the reflected light is greater. However, when it is desired that the light reflected at deeper portions in the multilayer optical recording medium is utilized, a problem arises in that most of the light is reflected at upper layers and the intensity of light reflected at the deepest interfaces becomes extremely small when the reflection of light at each layer is two great. Moreover, the degree of attenuation of the intensity is increased with increase in the number of the interface, and the working of the focus servo at the deepest portions becomes difficult. When the difference in the refractive indices between the release assisting layer and the pressure sensitive adhesive layer at the wavelength of the used laser is minimized, the reflection of light at the interface of the release assisting layer and the pressure sensitive adhesive layer can be minimized, and the loss in the laser light (the reflected light) can be decreased.

The wavelength of laser used for the multilayer optical recording medium is 660 nm or 405 nm. The refractive index of a substance is different depending on the wavelength. This means that the properties of the material must be designed suitably in accordance with the wavelength.

In the multilayer optical recording medium of the present invention, it is necessary that the absolute value of the difference between the refractive indices of the release assisting layer and the pressure sensitive adhesive layer at the wavelength of 660 nm is 0.11 or smaller. When the absolute value of the difference exceeds 0.11, the light reflected at the interface is increased to a degree which cannot be neglected. Therefore, it becomes difficult that the light from deep portions of the multilayer optical medium is utilized, and the property for recording becomes poor.

It is preferable that the absolute value of the difference between the refractive indices of the release assisting layer and the pressure sensitive adhesive layer at the wavelength of 405 nm is 0.11 or smaller based on the same reason as that described above.

Since the refractive index of the pressure sensitive adhesive layer at the wavelength of 660 nm is, in general, about 1.32 to 1.60, the refractive index of the release assisting layer at the wavelength of 660 nm is about 1.21 to 1.71 and preferably 1.42 to 1.60.

Since the refractive index of the pressure sensitive adhesive layer at the wavelength of 405 nm is, in general, about 1.35 to 1.65, the refractive index of the release assisting layer at the wavelength of 405 nm is about 1.24 to 1.76 and preferably 1.42 to 1.60. The method of the measurement of the refractive index will be described below.

[Layer Structure of the Sheet for Producing a Multilayer Optical Recording Medium]

The sheet for producing a multilayer optical recording medium of the present invention has a layer structure such that a unit comprising at least the release assisting layer, the optical recording layer and the pressure sensitive adhesive layer which are described above is disposed on the process film, the release assisting layer is disposed on the surface of the process film, and the pressure sensitive adhesive layer is disposed as the outermost layer. The structure and the number of the layer are not particularly limited as long as the unit comprises at least the release assisting layer, the optical recording layer and the pressure sensitive adhesive layer, and the release assisting layer is disposed at the side of the process film, and the pressure sensitive adhesive layer is disposed as the outermost layer.

Specific examples of the sheet for producing an optical recording medium of the present invention include the laminate sheets having the structure shown in the following FIGS. 1 and 2.

Figure 1:
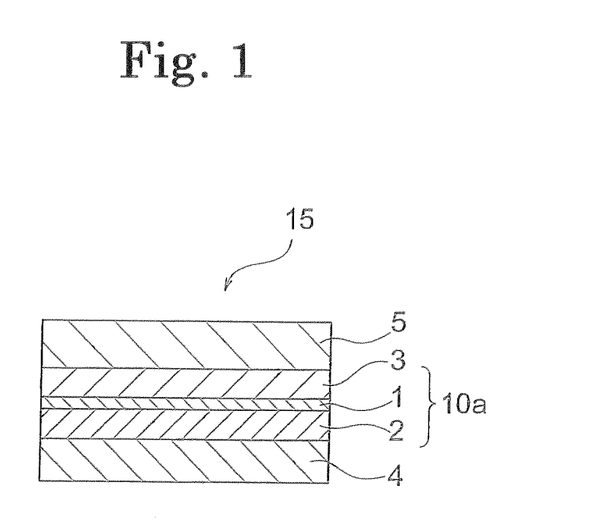
FIG. 1 shows a schematic sectional view exhibiting the structure of an example of the sheet for producing a multilayer optical recording medium of the present invention.

FIG. 1 shows a schematic sectional view exhibiting the structure of an example of the sheet for producing a multilayer optical recording medium of the present invention. The sheet for producing a multilayer optical recording medium 15 has a structure such that a unit 10a having the three layer structure in which a release assisting layer 2, an optical recording layer 1 and a pressure sensitive adhesive layer 3 are laminated successively is disposed on a process film 4. The release assisting layer 2 is placed adjacent to the surface of the process film 4, and a release film 5 is disposed on the pressure sensitive adhesive layer 3.

Figure 2:
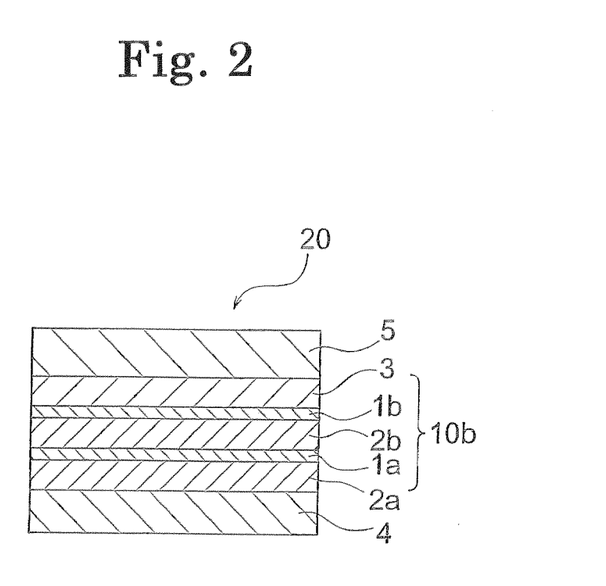
FIG. 2 shows a schematic sectional view exhibiting the structure of another example of the sheet for producing a multilayer optical recording medium of the present invention.

FIG. 2 shows a schematic sectional view exhibiting the structure of another example of the sheet for producing a multilayer optical recording medium of the present invention. The sheet for producing a multilayer optical recording medium 20 has a structure such that a unit 10b having the five layer structure in which a release assisting layer 2a, an optical recording layer 1a, a release assisting layer 2b, an optical recording layer 1b and a pressure sensitive adhesive layer 3 are laminated successively is disposed on a process film 4. The release assisting layer 2a is placed adjacent to the surface of the process film 4, and a release film 5 is disposed on the pressure sensitive adhesive layer 3.

The laminate sheets having the structure shown above in FIGS. 1 and 2 can be prepared by successively forming each layer on the process sheet 4 in accordance with a conventional coating process. When the optical recording layer is formed on the release assisting layer in the preparation, where necessary, a barrier layer may be formed on the release assisting layer before forming the optical recording layer to protect the release assisting layer depending on the type of the release assisting layer.

As the release film 5 described above, a release film conventionally used for a pressure sensitive adhesive layer may be used.

The release film 5 described above is not particularly limited. Examples of the release film include films obtained by coating a polyolefin film such as a polyethylene film and a polypropylene film or a polyester film such as a polyethylene terephthalate film with a releasing agent such as a silicone resin to form a layer of a releasing agent. The thickness of the release film is, in general, about 20 to 150 μm although the thickness is not particularly limited.

It is preferable that the maximum height as the roughness (Rz) of the surface of the pressure sensitive adhesive layer is smaller. Therefore, it is preferable that Rz of the surface of the release film treated for releasing is 500 nm or smaller. The measurement of Rz is conducted in accordance with the method of Japanese Industrial Standard B 0601.

The multilayer optical recording medium of the present invention will be described in the following.

[Multilayer Optical Recording Medium]

The multilayer optical recording medium of the present invention is characterized in that the medium is obtained by using the sheet for producing a multilayer optical recording medium described above.

The multilayer optical recording medium described above has a structure such that a plurality of the sheets for producing a multilayer optical recording medium described above are laminated via the pressure sensitive adhesive layer disposed at the outermost side. Specifically, the multilayer optical recording medium has a structure such that a plurality of units having a three layer structure in which a release assisting layer, an optical recording layer and a pressure sensitive adhesive layer are successively laminated as shown in FIG. 1 or a plurality of units having a five layer structure in which a release assisting layer, an optical recording layer, a release assisting layer, an optical recording layer and a pressure sensitive adhesive layer are successively laminated as shown in FIG. 2, are laminated via layers of a pressure sensitive adhesive.

The number of units laminated in the multilayer optical recording medium of the present invention is not particularly limited. It is preferable that the number of the optical recording layer is about 5 to 100 more preferably 8 to 80 from the standpoint of the recording density. When the number of the optical recording layer is smaller than 5, the sufficient recording density cannot be obtained. When the number of the optical recording layer exceeds 100, there is the possibility that problems arise in writing and reading information due to absorption of light at each layer and reflection at portions between the layers.

Figure 3:
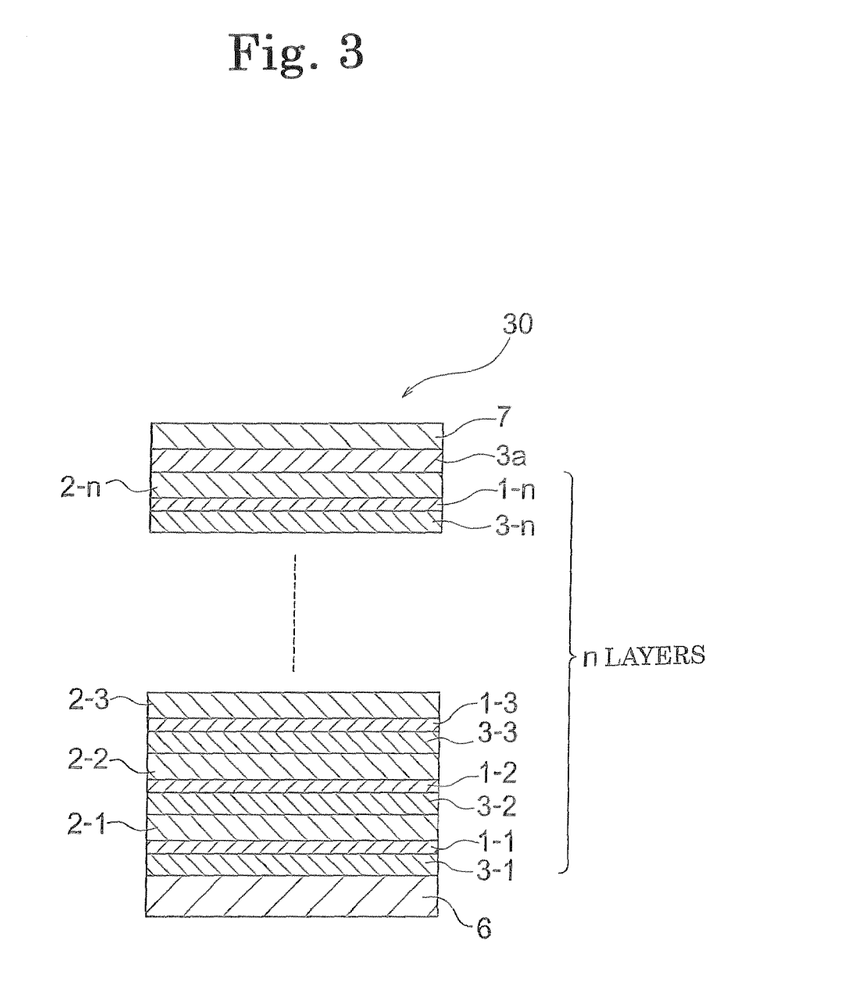
FIG. 3 shows a schematic sectional view exhibiting an example of the structure of the multilayer optical recording medium of the present invention.

FIG. 3 shows a schematic sectional view exhibiting an example of the structure of the multilayer optical recording medium of the present invention. The multilayer optical recording medium 30 has a structure such that n layers of a unit having a three layer structure comprising a pressure sensitive adhesive layer, an optical recording layer and a release assisting layer are laminated on a substrate 6 such as a polymethyl methacrylate film In the structure, a pressure sensitive adhesive layer 3-1, an optical recording layer 1-1, a release assisting layer 2-1, a pressure sensitive adhesive layer 3-2, an optical recording layer 1-2, a release assisting layer 2-2, a pressure sensitive adhesive layer 3-3, an optical recording layer 1-3, a release assisting layer 2-3, . . . a pressure sensitive adhesive layer 3-n, an optical recording layer 1-n and a release assisting layer 2-n are disposed.

The multilayer optical recording medium 30 having the above structure can be prepared, for example, as described in the following. Using a plurality of the sheets 15 shown in FIG. 1, the release film 5 of the first sheet 15 is released. The exposed pressure sensitive adhesive layer 3 and the substrate 6 shown in FIG. 3 are attached in a manner such that the exposed pressure sensitive adhesive layer and the substrate face each other, and the process film 4 is released. In this stage, the release assisting layer 2-1 in FIG. 3 is exposed. Then, the release film 5 is released from the second sheet 15, and the exposed pressure sensitive adhesive layer 3 and the release assisting layer 2-1 shown in FIG. 3 are attached in a manner such that both layers face each other. The lamination is repeated in accordance with the same procedures as those described above, and a multilayer optical recording medium 30 in which n optical recording layers are laminated can be obtained.

On the release assisting layer 2-n, a protective film such as a polyvinyl alcohol film may be disposed via the pressure sensitive adhesive layer 3a.

The thickness of the substrate 6 is not particularly limited. The thickness is, in general, about 5 to 1,000 μm and preferably 5 to 100 μm. Examples of the raw material for the substrate 6 include polymethyl methacrylate, polycarbonate, polyethylene terephthalate, polyolefins and glass.

The method of recording and reading information using the multilayer optical recording medium of the present invention is not particularly limited. A suitable method can be selected from conventional methods used for recording and reading information using multilayer optical recording media.

The form of the multilayer optical recording medium of the present invention is not particularly limited and may be any of the disk form and the roll form.

EXAMPLES

The present invention will be described more specifically with reference to examples in the following. However, the present invention is not limited to the examples.

The properties in Examples and Comparative Examples were obtained in accordance with the following methods.

(1) Peel Strength

Release films in sheets for producing a multilayer optical recording medium obtained in Examples 1 to 8 and Comparative Examples 1 and 2 were removed, and the remaining sheet was attached to a glass plate [manufactured by MATSU-NAMI GLASS INDUSTRIES, Ltd.; the trade name: "MICRO SLIDE GLASS S-112"] via the exposed pressure sensitive adhesive layer. Then, the peel strength was measured by peeling the process film at a peeling angle of 180° and a peeling speed of 300 mm/min under an environment of a temperature of 25° C. and a relative humidity of 50% using a tensile tester.

(2) Refractive Index

For the measurement of the refractive index of a release assisting layer in sheets for producing a multilayer optical recording medium obtained in Examples 1 to 8 and Comparative Example 2, the process film used in Example 5 was coated with a coating fluid for preparing a release assisting layer, and the obtained coating film was dried to form a release assisting layer having a thickness of 20 μm. The process film was removed, and the refractive index of the release assisting layer was measured using an Abbe refractometer [manufactured by ATAGO Co., Ltd.]. For the measurement of the refractive index of a pressure sensitive adhesive layer in sheets for producing a multilayer optical recording medium obtained in Examples 1 to 8 and Comparative Examples 1 and 2, the release film used in Example 1 was coated with a coating fluid for preparing a pressure sensitive adhesive layer, and the obtained coating film was dried to form a pressure sensitive adhesive layer having a thickness of 20 μm. The release film was removed, and the refractive index of the pressure sensitive adhesive layer was measured using an Abbe refractometer [manufactured by ATAGO Co., Ltd.]. The refractive index of an optical recording layer in sheets for producing a multilayer optical recording medium obtained in Examples 1 to 8 and Comparative Examples 1 and 2 was measured using an elipsometer [manufactured by J. A. WOOLLAM JAPAN Co., Inc.; the trade name: "SPECTRO-ELIPSOMETRY 2000U"] when the optical recording layer was formed on the surface of a release assisting layer or a process film in the process for producing the sheet for producing a multilayer optical recording medium.

(3) Thickness of a Layer

The thickness of a release assisting layer and a pressure sensitive adhesive layer in sheets for producing a multilayer optical recording medium in Examples 1 to 8 and Comparative Example 2 and the thickness of a pressure sensitive adhesive layer in the sheet for producing a multilayer optical recording medium in Comparative Example 1 were obtained by calculation based on the results of the measurement of the thickness of the entire sheet before and after a layer was formed in the step of forming each layer in the process for producing the sheets for producing a multilayer optical recording medium using a thickness meter of the pressure type [manufactured by TECLOCK Corporation; the trade name: "PG-02"]. The thickness of an optical recording layer in sheets for producing a multilayer optical recording medium in Examples 1 to 8 and Comparative Examples 1 and 2 was measured using an elipsometer [manufactured by J. A. WOOLLAM JAPAN Co., Inc.; the trade name: "SPECTRO-ELIPSOMETRY 2000U"] when the optical recording layer was formed on the surface of a release assisting layer or on the process film in the process for producing sheets for producing a multilayer optical recording medium.

(4) Intensity of Reflected Light

The intensity of reflected light was confirmed for multilayer optical recording media obtained in Examples 9 to 16 and Comparative Example 3 as described in the following.

A semiconductor laser having a wavelength of 405 nm [manufactured by TOPICA Company; the trade name: "CUBE 405-100C"] or a semiconductor laser having a wavelength of 660 nm [manufactured by TOPICA Company; the trade name: "iPULSE 660"] was set into a cofocussing optical system, and a multilayer recording medium was irradiated with a laser beam having a wavelength described above from the side having a protective film. (i) The intensity of light reflected at the interface of the first release assisting layer from the side of the protective film and the pressure sensitive adhesive layer adjacent to the first release assisting layer; (ii) the intensity of light reflected at the interface of the first optical recording layer from the side of the protective film and the pressure sensitive adhesive layer adjacent to the first optical recording layer in Examples 9 to 15 and Comparative Example 3, and the intensity of light reflected at the interface of the second optical recording layer from the side of the protective film and the pressure sensitive adhesive layer adjacent to the second optical recording layer in Example 16; and (iii) the intensity of light reflected at the interface of the 20th optical recording layer from the side of the protective film and the pressure sensitive adhesive layer adjacent to the optical recording layer, were measured. The ratio of the intensity of reflected light (ii) to the intensity of reflected light (i) (Intensity ratio 1) and the ratio of the intensity of reflected light (iii) to the intensity of reflected light (ii) (Intensity ratio 2) were calculated. Intensity ratio 1 can be used as the index for examination of the reflected light at the interface of the optical recording layer and the pressure sensitive adhesive layer, and the result can be decided as good (the position of the presence of the optical recording layer recognizable) when the value is 1.5 or greater. Intensity ratio 2 shows the degree of attenuation of the reflected light at the optical recording layer at the deep position in a multilayer optical recording medium, and the result can be decided as good (the light reflected at the optical recording layer at the deep position recognizable) when the value is 0.1 to 1.

(5) Property for Recording

Using multilayer optical recording media obtained in Examples 9 to 16 and Comparative Example 3, the experiment of recording was conducted under the following condition.

The 20th optical recording layer from the side of the protective layer was irradiated with laser light 25 times in the cofocal optical system using a titanium sapphire femtosecond laser (the wavelength: 780 nm) as the light source. The average intensity of the laser beam was set at 60 (mW), and 5 recordings were made in each time of irradiation of 128 milliseconds, 64 milliseconds, 32 milliseconds, 16 milliseconds and 8 milliseconds (25 recordings in all). Then, using a semiconductor laser having a wavelength of 405 nm [manufactured by TOPICA Company; the trade name: "CUBE 405-

100C"] in the same cofocal optical system, the number of the cases where the spot of the recording was observed was counted.

Example 1

(1) Preparation of a Coating Fluid for Preparing a Release Assisting Layer

A coating fluid having a concentration of solid components of 10% by mass was prepared by mixing 463.5 g of methyl ethyl ketone as the solvent and 1.5 g of 1-hydroxycyclohexyl phenyl ketone [manufactured by CIBA SPECIALTY CHEMICALS K. K.; the trade name: "IRGACURE 184"] as the photopolymerization initiator with 50 g of neopentyl glycol diacrylate [manufactured by SHIN-NAKAMURA CHEMICAL Co., Ltd.; the trade name: "NK ESTER A-NPG"; the content of solid components: 100%] as the compound curable with the ultraviolet light (an energy curable compound).

(2) Preparation of Coating Fluid for Preparing an Optical Recording Layer

A coating fluid having a concentration of solid components of 5% by mass was prepared by mixing 5 g of 1,1-bis[4-[N,N-di(p-tolyl)amino]-phenynl]cyclohexane [manufactured by TOKYO CHEMICAL INDUSTRY Co., Ltd.] as the multiphoton absorbing material with 95 g of toluene as the solvent.

(3) Preparation of a Coating Fluid for Preparing a Pressure Sensitive Adhesive Layer A coating fluid having a content of solid components of 30% by mass was prepared by adding 1 g of a xylylene diisocyanate-based crosslinking agent [manufactured by SOKEN CHEMICAL AND ENGINEERING Co., Ltd.; the trade name: "TD-75"; the concentration of solid components: 75% by mass] to 100 g of an ethyl acetate solution (the concentration of solid components: 30% by mass) of an acrylic acid ester copolymer (the weight-average molecular weight: 600,000) comprising n-butyl acrylate, phenoxyethyl acrylate and hydroxyethyl acrylate (n-butyl acrylate/phenoxyethyl acrylate/hydroxyethyl acrylate=60:35:5 (the ratio of the amounts by mass)), followed by stirring the obtained mixture.

(4) Preparation of a Sheet for Producing an Optical Recording Medium

One face of a polyethylene terephthalate film [manufactured by TOYOBO Co., Ltd.; the trade name: "PET 50A-4100"] having a thickness of 50 μm used as the process film was coated with the coating fluid for preparing a release assisting layer in accordance with the gravure coating process, and the resultant layer was dried at 90° C. for 1 minute. To the dried layer, a polyethylene terephthalate film [manufactured by TOYOBO Co., Ltd.; the trade name: "PET 50A-4100"] having a thickness of 50 μm was attached under a pressure using two rubber rollers. The obtained laminate was irradiated with ultraviolet light under the condition of an amount of light of 500 mJ/cm$^2$ and a luminance of 120 mW/cm$^2$ using an apparatus for irradiation of ultraviolet light [manufactured by GS-YUASA LIGHTING Co., Ltd.; the trade name: "UVSYSTEM CSN2-40"] under the atmosphere of nitrogen, and a release assisting layer having a thickness of 6.2 μm was formed. The amount of light and the luminance of ultraviolet light were measured using a meter of the amount of light and the luminance [manufactured by GS-YUASA LIGHTING Co., Ltd.; the trade name: "UVR-N1"] (similarly in the following descriptions). The polyethylene terephthalate film attached under the pressure was removed, the exposed surface of the release assisting layer was coated with the coating fluid for preparing an optical recording layer in accordance with the gravure coating process. The resultant layer was dried at 90° C. for 1 minute, and an optical recording layer was formed. The thickness of the obtained optical recording layer was 110 nm. Separately, the face for releasing of a release film [manufactured by LINTEC Corporation; the trade name: "PET381031"] was coated with the coating fluid for preparing a pressure sensitive adhesive layer in accordance with the knife coating process. The resultant layer was dried at 90° C. for 1 minute, and a pressure sensitive adhesive sheet was prepared. The thickness of the pressure sensitive adhesive layer prepared above was 5.1 μm. The pressure sensitive adhesive layer of the obtained pressure sensitive adhesive sheet was pressed to the optical recording layer obtained above using two rubber rollers, and a sheet for producing an optical recording medium was obtained.

Example 2

A sheet for producing an optical recording medium was prepared using the coating fluid for preparing an optical recording layer and the coating fluid for preparing a pressure sensitive adhesive layer used in Example 1 while the preparation of the coating fluid for preparing a release assisting layer was changed as described in the following.

<Preparation of a Coating Fluid for Preparing a Release Assisting Layer>

A coating fluid having a concentration of solid components of 5% by mass was prepared by mixing 95 g of purified water as the solvent with 5 g of polyvinyl alcohol [manufactured by THE NIPPON SYNTHETIC CHEMICAL INDUSTRY Co., Ltd.; the trade name: "GOSENOL T-350"].

<Preparation of a Sheet for Producing an Optical Recording Medium>

One face of a polyethylene terephthalate film [manufactured by TOYOBO Co., Ltd.; the trade name: "PET 50A-4100"] having a thickness of 50 μm used as the process film was coated with the coating fluid for preparing a release assisting layer in accordance with the gravure coating process. The resultant layer was dried at 90° C. for 1 minute, and a release assisting layer having a thickness of 0.4 μm was formed. The surface of the release assisting layer obtained above was coated with the coating fluid for preparing an optical recording layer in accordance with the gravure coating process. The resultant layer was dried at 90° C. for 1 minute, and an optical recording layer was formed. The thickness of the obtained optical recording layer was 80 nm. Separately, the face for releasing of a release film [manufactured by LINTEC Corporation; the trade name: "PET381031"] was coated with the coating fluid for preparing a pressure sensitive adhesive layer in accordance with the knife coating process. The resultant layer was dried at 90° C. for 1 minute, and a pressure sensitive adhesive sheet was prepared. The thickness of the pressure sensitive adhesive layer prepared above was 10.5 μm. The pressure sensitive adhesive layer of the obtained pressure sensitive adhesive sheet was pressed to the optical recording layer obtained above using two rubber rollers, and a sheet for producing an optical recording medium was obtained.

Example 3

A sheet for producing an optical recording medium was prepared using the coating fluid for preparing an optical recording layer and the coating fluid for preparing a pressure sensitive adhesive layer used in Example 1 while the preparation of the coating fluid for preparing a release assisting layer was changed as described in the following.

<Preparation of a Coating Fluid for Preparing a Release Assisting Layer>

A coating fluid having a concentration of solid components of 5% by mass was prepared by mixing 95 g of xylene as the solvent with 5 g of a cycloolefin-based resin [manufactured by POLYPLASTICS Co., Ltd.; the trade name: "TOPAS 5013"].

<Preparation of a Sheet for Producing an Optical Recording Medium>

One face of a polyethylene terephthalate film [manufactured by TOYOBO Co., Ltd.; the trade name: "PET 50A-4100"] having a thickness of 50 μm used as the process film was coated with the coating fluid for preparing a release assisting layer in accordance with the gravure coating process. The resultant layer was dried at 90° C. for 1 minute, and a release assisting layer having a thickness of 1 μm was formed. The surface of the release assisting layer obtained above was coated with the coating fluid for preparing an optical recording layer in accordance with the gravure coating process. The resultant layer was dried at 90° C. for 1 minute, and an optical recording layer was formed. The thickness of the obtained optical recording layer was 600 nm. Separately, the face for releasing of a release film [manufactured by LINTEC Corporation; the trade name: "PET381031"] was coated with the coating fluid for preparing a pressure sensitive adhesive layer in accordance with the knife coating process. The resultant layer was dried at 90° C. for 1 minute, and a pressure sensitive adhesive sheet was prepared. The thickness of the pressure sensitive adhesive layer prepared above was 10.5 μm. The pressure sensitive adhesive layer of the obtained pressure sensitive adhesive sheet was pressed to the optical recording layer obtained above using two rubber rollers, and, a sheet for producing an optical recording medium was obtained.

Example 4

A sheet for producing an optical recording medium was prepared using the coating fluid for preparing an optical recording layer used in Example 1 while the preparation of the coating fluid for preparing a release assisting layer and the coating fluid for preparing a pressure sensitive adhesive layer were changed as described in the following.

<Preparation of a Coating Fluid for a Release Assisting Layer>

A coating fluid having a concentration of solid components of 3% by mass was prepared by adding 97 g of dichloromethane as the solvent to 3 g of triacetylcellulose [manufactured by DAICEL CHEMICAL INDUSTRIES Ltd.; the trade name: "LT-105"].

<Preparation of Coating Fluid for Pressure Sensitive Adhesive Layer>

A coating fluid was prepared by adding 2 g of an aluminum chelate-based crosslinking agent [manufactured by SOKEN CHEMICAL AND ENGINEERING Co. Ltd.; the trade name: "M-5A"; the concentration of solid components: 5% by mass] to 100 g of an ethyl acetate solution (the concentration of solid components: 30% by mass) of an acrylic acid ester copolymer (the weight-average molecular weight: 1,000,000) comprising n-butyl acrylate and acrylic acid (n-butyl acrylate/acrylic acid=95:5 (the ratio of amounts by mass)), followed by stirring the obtained mixture.

<Preparation of a Sheet for Producing an Optical Recording Medium>

One face of a polyethylene terephthalate film [manufactured by TOYOBO Co., Ltd.; the trade name: "PET 50A-4100"] having a thickness of 50 μm used as the process film was coated with the coating fluid for preparing a release assisting layer in accordance with the gravure coating process. The resultant layer was dried at 90° C. for 1 minute, and a release assisting layer having a thickness of 2 μm was formed. The surface of the release assisting layer obtained above was coated with the coating fluid for preparing an optical recording layer in accordance with the gravure coating process. The resultant layer was dried at 90° C. for 1 minute, and an optical recording layer was formed. The thickness of the obtained optical recording layer was 400 nm. Separately, the face for releasing of a release film [manufactured by LINTEC Corporation; the trade name: "PET381031"] was coated with the coating fluid for preparing a pressure sensitive adhesive layer in accordance with the knife coating process. The resultant layer was dried at 90° C. for 1 minute, and a pressure sensitive adhesive sheet was prepared. The thickness of the pressure sensitive adhesive layer prepared above was 3.2 μm. The pressure sensitive adhesive layer of the obtained pressure sensitive adhesive sheet was pressed to the optical recording layer obtained above using two rubber rollers, and a sheet for producing an optical recording medium was obtained.

Example 5

A sheet for producing an optical recording medium was prepared using the coating fluid for preparing an optical recording layer and the coating fluid for preparing a pressure sensitive adhesive layer used in Example 1 while the preparation of the coating fluid for preparing a release assisting layer was changed as described in the following.

<Preparation of a Coating Fluid for a Release Assisting Layer>

A coating fluid was prepared by adding 100 g of methyl ethyl ketone and 4 g of xylylene diisocyanate-based crosslinking agent [manufactured by SOKEN CHEMICAL AND ENGINEERING Co., Ltd.; the trade name: "TD-75"; the concentration of solid components: 75% by mass] to 100 g of an acrylic resin curable with heat comprising fluorine atom [manufactured by SANWA LABORATORY Ltd.; the trade name: "FA-300G-EA"; the content of solid components: 30% by mass], followed by stirring the obtained mixture.

<Preparation of a Sheet for Producing an Optical Recording Medium>

One face of a release film having a layer of an alkyd-based releasing agent [manufactured by LINTEC Corporation; the trade name: "PET 38AL-5"] used as the process film was coated with the coating fluid for preparing a release assisting layer in accordance with the gravure coating process. The resultant layer was dried at 90° C. for 1 minute, and a release assisting layer having a thickness of 3.5 μm was formed. The surface of the release assisting layer obtained above was coated with the coating fluid for preparing an optical recording layer in accordance with the gravure coating process. The resultant layer was dried at 90° C. for 1 minute, and an optical recording layer was formed. The thickness of the obtained optical recording layer was 600 nm, Separately, the face for releasing of a release film [manufactured by LINTEC Corporation; the trade name: "PET381031"] was coated with the coating fluid for preparing a pressure sensitive adhesive layer in accordance with the knife coating process. The resultant layer was dried at 90° C. for 1 minute, and a pressure sensitive adhesive sheet was prepared. The thickness of the pressure sensitive adhesive layer prepared above was 10.5 µm. The pressure sensitive adhesive layer of the obtained pressure sensitive adhesive sheet was pressed to the optical recording layer obtained above using two rubber rollers, and a sheet for producing an optical recording medium was obtained.

Example 6

A sheet for producing an optical recording medium was prepared using the coating fluid for preparing an optical recording layer and the coating fluid for preparing a pressure sensitive adhesive layer used in Example 4 while the preparation of the coating fluid for preparing a release assisting layer was changed as described in the following.
<Preparation of a Coating Fluid for a Release Assisting Layer>
A coating fluid having a concentration of solid components of 50% by mass was prepared by mixing 25 g of a compound curable with ultraviolet light having polymerizable double bond in side chains (the weight-average molecular weight; 20,000) which was obtained by adding acryloxyethyl isocyanate to an acrylic acid ester copolymer comprising trifluoroethyl methacrylate and 2-hydroxyethyl methacrylate (trifluoroethyl methacrylate: 2-hydroxyethyl methacrylate=955 (the ratio of amount by mass) (addition to 90% by mole of hydroxyl group of 2-hydroxyethyl methacrylate), 25 g of a polyfunctional acrylate compound curable with ultraviolet light [manufactured by SHIN-NAKAMURA CHEMICAL Co., Ltd.; the trade name: "NK ESTER A-TMMT"], 50 g of methyl ethyl ketone as the solvent and 1.5 g of 1-hydroxycyclohexyl phenyl ketone [manufactured by CIBA SPECIALTY CHEMICALS K. K.; the trade name: "IRGACURE 184"] as the photopolymerization initiator.
<Preparation of a Sheet for Producing an Optical Recording Medium>
One face of a polyethylene terephthalate film [manufactured by TOYOBO Co., Ltd.; the trade name: "PET 50A-4100"] having a thickness of 50 µm used as the process film was coated with the coating fluid for preparing a release assisting layer in accordance with the gravure coating process. The resultant layer was dried at 90° C. for 1 minute. To the obtained layer, a polyethylene terephthalate film [manufactured by TOYOBO Co., Ltd.; the trade name: "PET 50A-4100"] having a thickness of 50 µm was laminated under a pressure using two rubber rollers. A release assisting layer having a thickness of 6.6 µm was formed by irradiation of ultraviolet light under the condition of an amount of light of 500 mJ/cm² and a luminance of 120 mW/cm² using an apparatus for irradiation of ultraviolet light [manufactured by GS-YUASA LIGHTING Co., Ltd.; the trade name: "UV SYSTEM CSN2-40"] under the atmosphere of nitrogen. The polyethylene terephthalate film laminated under a pressure was removed. The exposed surface of the release assisting layer was coated with the coating fluid for preparing an optical recording layer in accordance with the gravure coating process, and the formed coating layer was dried at 90° C. for 1 minute. The obtained optical recording layer had a thickness of 50 nm. Separately, the face for releasing of a release film [manufactured by LINTEC Corporation; the trade name: "PET381031"] was coated with the coating fluid for preparing a pressure sensitive adhesive layer in accordance with the knife coating process. The resultant layer was dried at 90° C. for 1 minute, and a pressure sensitive adhesive sheet was prepared. The thickness of the pressure sensitive adhesive layer prepared above was 3.2 µm. The pressure sensitive adhesive layer of the obtained pressure sensitive adhesive sheet was pressed to the optical recording layer obtained above using two rubber rollers, and a sheet for producing an optical recording medium was obtained.

Example 7

A sheet for producing an optical recording medium was prepared using the coating fluid for preparing an optical recording layer and the coating fluid for preparing a pressure sensitive adhesive layer used in Example 4 while the preparation of the coating fluid for preparing a release assisting layer was changed as described in the following.
<Preparation of a Coating Fluid for a Release Assisting Layer>
A coating fluid having a concentration of solid components of 50% by mass was prepared by mixing 40 g of a compound curable with ultraviolet light having the skeleton structure of bisphenol A [manufactured by SHIN-NAKAMURA CHEMICAL Co., Ltd.; the trade name: "NK ESTER A-BPE-4"], 10 g of a compound curable with ultraviolet light [manufactured by SHIN-NAKAMURA CHEMICAL Co., Ltd.; the trade name: "NK ESTER A-GLY-3EO"], 50 g of methyl ethyl ketone as the solvent and 1.5 g of a photopolymerization initiator [manufactured by CIBA SPECIALTY CHEMICALS K. K.; the trade name: "IRGACURE 184"].
<Preparation of a Sheet for Producing an Optical Recording Medium>
One face of a polyethylene terephthalate film [manufactured by TOYOBO Co., Ltd.; the trade name: "PET 50A-4100"] having a thickness of 50 µm used as the process film was coated with the coating fluid for preparing a release assisting layer in accordance with the gravure coating process. The resultant layer was dried at 90° C. for 1 minute. To the obtained layer, a polyethylene terephthalate film [manufactured by TOYOBO Co., Ltd.; the trade name: "PET 50A-4100"] having a thickness of 50 µm was laminated under a pressure using two rubber rollers. A release assisting layer having a thickness of 6.1 µm was formed by irradiation of ultraviolet light at a condition of a quantity of light of 500 mJ/cm² and an illuminance of 120 mW/cm² under an atmosphere of nitrogen using an apparatus for irradiation of ultraviolet light [manufactured by GS-YUASA LIGHTING Co., Ltd.; the trade name: "UV SYSTEM CSN2-40"]. The polyethylene terephthalate film laminated under a pressure was removed. The exposed surface of the release assisting layer was coated with the coating fluid for preparing an optical recording layer in accordance with the gravure coating process, and the formed coating layer was dried at 90° C. for 1 minute. The obtained optical recording layer had a thickness of 100 nm, Separately, the face for releasing of a release film [manufactured by LINTEC Corporation; the trade name: "PET381031"] was coated with the coating fluid for preparing a pressure sensitive adhesive layer in accordance with the knife coating process. The resultant layer was dried at 90° C. for 1 minute, and a pressure sensitive adhesive sheet was prepared. The thickness of the pressure sensitive adhesive layer prepared above was 3.2 p.m. The pressure sensitive adhesive layer of the obtained pressure sensitive adhesive sheet was pressed to the optical recording layer obtained above using two rubber rollers, and a sheet for producing an optical recording medium was obtained.

Example 8

A sheet for producing an optical recording medium was prepared using the same coating fluids as those used in Example 2 as described in the following.

<Preparation of a Sheet for Producing an Optical Recording Medium>

One face of a polyethylene terephthalate film [manufactured by TOYOBO Co., Ltd.; the trade name: "PET 50A-4100"] having a thickness of 50 μm used as the process film was coated with the coating fluid for preparing a release assisting layer in accordance with the gravure coating process. The resultant layer was dried at 90° C. for 1 minute, and a release assisting layer having a thickness of 0.4 μm was formed. The surface of the release assisting layer obtained above was coated with the coating fluid for preparing an optical recording layer in accordance with the gravure coating process. The resultant layer was dried at 90° C. for 1 minute, and an optical recording layer was formed. The thickness of the obtained optical recording layer was 80 nm. The surface of the obtained optical recording layer was coated with the coating fluid for preparing the release assisting layer in accordance with the gravure coating process. The formed coating layer was dried at 90° C. for 1 minute, and a release assisting layer having a thickness of 0.4 μm was formed. The surface of the release assisting layer was coated with the coating fluid for preparing an optical recording layer in accordance with the gravure coating process. The resultant layer was dried at 90° C. for 1 minute, and an optical recording layer was formed. The thickness of the obtained optical recording layer was 80 nm. Separately, the face for releasing of a release film [manufactured by LINTEC Corporation; the trade name: "PET381031"] was coated with the coating fluid for preparing a pressure sensitive adhesive layer in accordance with the knife coating process. The resultant layer was dried at 90° C. for 1 minute, and a pressure sensitive adhesive sheet was prepared. The thickness of the pressure sensitive adhesive layer prepared above was 10.5 μm. The pressure sensitive adhesive layer of the obtained pressure sensitive adhesive sheet was pressed to the optical recording layer obtained above using two rubber rollers, and a sheet for producing an optical recording medium having the release assisting layer, the optical recording layer, the release assisting layer, the optical recording layer and the pressure sensitive adhesive layer laminated on the process film was obtained.

Comparative Example 1

A sheet for producing an optical recording medium was prepared in accordance with the same procedures as those conducted in Example 4 except that the optical recording layer was directly formed on the process film without forming the release assisting layer.

Comparative Example 2

A sheet for producing an optical recording medium was prepared using the coating fluid for preparing an optical recording layer and the coating fluid for preparing a pressure sensitive adhesive layer used in Example 4 while the preparation of the coating fluid for preparing a release assisting layer was changed as described in the following.

<Preparation of a Coating Fluid for a Release Assisting Layer>

A coating fluid having a concentration of solid components of 50% by mass was prepared by mixing 45 g of a compound curable with ultraviolet light having the skeleton structure of fluorene [manufactured by OSAKA GAS CHEMICALS Co., Ltd.; the trade name: "OGSOLE EA-F5003"], 5 g of a compound curable with ultraviolet light [manufactured by SHIN-NAKAMURA CHEMICAL Co., Ltd.; the trade name: "NK ESTER A-GLY-3EO"], 50 g of methyl ethyl ketone as the solvent and 1.5 g of 1-hydroxycyclohexyl phenyl ketone [manufactured by CIBA SPECIALTY CHEMICALS K. K.; the trade name: "IRGACURE 184"] as the photopolymerization initiator.

<Preparation of a Sheet for Producing an Optical Recording Medium>

One face of a polyethylene terephthalate film [manufactured by TOYOBO Co., Ltd.; the trade name: "PET 50A-4100"] having a thickness of 50 μm used as the process film was coated with the coating fluid for preparing a release assisting layer in accordance with the gravure coating process. The resultant layer was dried at 90° C. for 1 minute. To the obtained layer, a polyethylene terephthalate film [manufactured by TOYOBO Co., Ltd.; the trade name: "PET 50A-4100"] having a thickness of 50 μm was laminated under a pressure using two rubber rollers. A release assisting layer having a thickness of 7.0 μm was formed by irradiation of ultraviolet light under the condition of an amount of light of 500 mJ/cm$^2$ and a luminance of 120 mW/cm$^2$ using an apparatus for irradiation of ultraviolet light [manufactured by GS-YUASA LIGHTING Co., Ltd.; the trade name: "UV SYSTEM CSN2-40"] under the atmosphere of nitrogen. One of the polyethylene terephthalate films was removed. The exposed surface of the release assisting layer was coated with the coating fluid for preparing an optical recording layer in accordance with the gravure coating process, and the formed coating layer was dried at 90° C. for 1 minute. The obtained optical recording layer had a thickness of 200 nm. Separately, the face for releasing of a release film [manufactured by LINTEC Corporation; the trade name: "PET381031"] was coated with the coating fluid for preparing a pressure sensitive adhesive layer in accordance with the knife coating process. The resultant layer was dried at 90° C. for 1 minute, and a pressure sensitive adhesive sheet was prepared. The thickness of the pressure sensitive adhesive layer prepared above was 3.2 μm. The pressure sensitive adhesive layer of the obtained pressure sensitive adhesive sheet was pressed to the optical recording layer obtained above using two rubber rollers, and a sheet for producing an optical recording medium was obtained.

For the sheets for producing an optical recording medium obtained in Examples 1 to 8 and Comparative Examples 1 and 2, the types of raw materials in each layer are shown in Table 1, and the thickness and the refractive index of each layer are shown in Table 2.

TABLE 1

| | Release assisting layer [type of raw material] | Optical recording layer [type of raw material] | Pressure sensitive adhesive layer [type of raw material (ratio of amount by mass)] |
|---|---|---|---|
| Example 1 | compound curable with ultra-violet light [1] | coloring material A [9] | BA [10]/PEA [11]/HEA [12] (60/35/5) |
| Example 2 | polyvinyl alcohol [2] | coloring material A | BA/PEA/HEA (60/35/5) |

TABLE 1-continued

|  | Release assisting layer [type of raw material] | Optical recording layer [type of raw material] | Pressure sensitive adhesive layer [type of raw material (ratio of amount by mass)] |
| --- | --- | --- | --- |
| Example 3 | cycloolefin-based resin [3] | coloring material A | BA/PEA/HEA (60/35/5) |
| Example 4 | triacetylcellulose [4] | coloring material A | BA/AA [13] (95/5) |
| Example 5 | fluorine-based resin curable with heat [5] | coloring material A | BA/PEA/HEA (60/35/5) |
| Example 6 | fluorine-based compound curable with ultraviolet light [6] | coloring material A | BA/AA (95/5) |
| Example 7 | compound curable with ultraviolet light [7] | coloring material A | BA/AA (95/5) |
| Example 8 | polyvinyl alcohol | coloring material A | BA/PEA/HEA (60/35/5) |
| Comparative Example 1 | none | coloring material A | BA/AA (95/5) |
| Comparative Example 2 | compound curable with ultraviolet light [8] | coloring material A | BA/AA (95/5) |

Notes
[1] Compound curable with ultraviolet light: manufactured by SHIN-NAKAMURA CHEMICAL Co., Ltd.; "NK ESTER A-NPG"
[2] Polyvinyl alcohol: manufactured by THE NIPPON SYNTHETIC CHEMICAL INDUSTRY Co., Ltd.; "GOSENOL T-350"
[3] Cycloolefin-based resin: manufactured by POLYPLASTICS Co., Ltd.; "TOPAS 6013"
[4] Triacetylcellulose: manufactured by DAICEL CHEMICAL INDUSTRIES Ltd.; "LT-105"
[5] Fluorine-based resin curable with heat: manufactured by SANWA LABORATORY Ltd.; "FA-300G-EA"
[6] Fluorine-based compound curable with ultraviolet light: a mixture of a compound curable with ultraviolet light having polymerizable double bond in side chains which is obtained by adding acryloxyethyl isocyanate to an acrylic acid ester copolymer comprising trifluoroethyl methacrylate and 2-hydroxyethyl methacrylate and "NK ESTER A-TMMT" manufactured by SHIN-NAKAMURA CHEMICAL Co., Ltd..
[7] Compound curable with ultraviolet light: a mixture of a compound manufactured by SHIN-NAKAMURA CHEMICAL Co., Ltd. having a trade name of "NK ESTER A-BPE-4" and a compound manufactured by SHIN-NAKAMURA CHEMICAL Co., Ltd. having a trade name of "NK ESTER A-GLE-3EO"
[8] Compound curable with ultraviolet light: a mixture of a compound manufactured by OSAKA GAS CHEMICALS Co., Ltd. having a trade name of "OGSOL EA-F5003" and a compound manufactured by SHIN-NAKAMURA CHEMICAL Co., Ltd. having a trade name of "NK ESTER A-GLE-3EO"
[9] Coloring material A: 1,1-bis[4-[N,N-di(p-tolyl)amino]phenyl]-cyclohexane
[10] BA: n-butyl acrylate
[11] PEA: phenoxyethyl acrylate
[12] HEA: hydroxyethyl acrylate
[13] AA: acrylic acid Examples 9 to 16 and Comparative Example 3

Multilayer optical recording media of Examples 9 to 16 and Comparative Example 3 were prepared by laminating the sheets for producing an optical recording medium obtained in Examples 1 to 8 and Comparative Example 2 each in accordance with the method described in the following. No multilayer optical recording media could be prepared from the sheet for producing an optical recording medium obtained in Comparative Example 1 since the optical recording layer was broken when the process film was removed from the optical recording layer.

(1) The release film in a sheet for producing an optical recording medium was removed, and the obtained laminate was attached to a glass substrate used as the support via the exposed pressure sensitive adhesive layer.
(2) The process film was removed, and the release assisting layer was exposed.
(3) The release film in another sheet for producing an optical recording medium was removed, and the obtained laminate was laminated to the release assisting layer exposed above in (2) via the pressure sensitive adhesive layer.
(4) The procedures of (2) and (3) described above were repeated, and a laminate having 20 optical recording layers was prepared.
(5) The last process film was removed, and a protective film transmitting light comprising a polyvinyl alcohol film (the thickness: 10 μm) was laminated to the exposed release assisting layer via a pressure sensitive adhesive layer (the thickness: 20 μm). A multilayer optical recording medium having 20 optical recording layers was prepared in this manner. The polyvinyl alcohol film was prepared by coating the process film used in Example 2 with an aqueous solution (the concentration: 10% by mass) of polyvinyl alcohol [manufactured by THE NIPPON SYNTHETIC CHEMICAL INDUSTRY Co., Ltd.; the trade name: "GOSENOL T-350"], followed by drying the formed film at 100° C. for 2 minutes. As the pressure sensitive adhesive for forming the pressure sensitive adhesive layer, the same pressure sensitive adhesive as that used for preparing the sheets for producing an optical recording medium in each Example and Comparative Examples was used.

TABLE 2

|  | Release assisting layer | | | Optical recording layer | | | Pressure sensitive adhesive layer | | |
| --- | --- | --- | --- | --- | --- | --- | --- | --- | --- |
|  | thickness | refractive index | | thickness | refractive index | | thickness | refractive index | |
|  | (μm) | [660 nm] | [405 nm] | (nm) | [660 nm] | [405 nm] | (μm) | [660 nm] | [405 nm] |
| Example | | | | | | | | | |
| 1 | 6.2 | 1.496 | 1.513 | 110 | 1.600 | 1.646 | 5.1 | 1.494 | 1.515 |
| 2 | 0.4 | 1.517 | 1.535 | 80 | 1.600 | 1.646 | 10.5 | 1.494 | 1.515 |
| 3 | 1.0 | 1.534 | 1.555 | 600 | 1.600 | 1.646 | 10.5 | 1.494 | 1.515 |
| 4 | 2.0 | 1.466 | 1.481 | 400 | 1.600 | 1.646 | 3.2 | 1.465 | 1.482 |
| 5 | 3.5 | 1.466 | 1.481 | 600 | 1.600 | 1.646 | 10.5 | 1.494 | 1.515 |
| 6 | 6.6 | 1.470 | 1.485 | 50 | 1.600 | 1.646 | 3.2 | 1.465 | 1.482 |
| 7 | 6.1 | 1.548 | 1.576 | 100 | 1.600 | 1.646 | 3.2 | 1.465 | 1.482 |
| 8 | 0.4 | 1.517 | 1.535 | 80 | 1.600 | 1.646 | 10.5 | 1.494 | 1.515 |
| Comparative Example | | | | | | | | | |
| 1 | — | — | — | 110 | 1.600 | 1.646 | 5.1 | 1.465 | 1.482 |
| 2 | 7.0 | 1.590 | 1.633 | 200 | 1.600 | 1.646 | 3.2 | 1.465 | 1.482 |

Properties of the multilayer optical recording media obtained as described above were obtained. The peel strength of the sheets for producing an optical recording medium is shown in Table 3. The absolute value (Δn) of the difference between refractive indices of the release assisting layer and the pressure sensitive adhesive layer, Intensity ratios of reflected light and the property of recording are shown in Table 4.

TABLE 3

|  | Peel strength ((mN/25 mm)) |
|---|---|
| Example 1 | 75 |
| Example 2 | 20 |
| Example 3 | 105 |
| Example 4 | 60 |
| Example 5 | 83 |
| Example 6 | 150 |
| Example 7 | 250 |
| Example 8 | 200 |
| Comparative Example 1 | ≥1030 |
| Comparative Example 2 | 105 |

TABLE 4

|  | Δn between release assisting layer and pressure sensitive adhesive layer | | Ratio of intensities of reflected light | | | | Property of recording |
|---|---|---|---|---|---|---|---|
|  | [660 nm] | [405 nm] | Intensity ratio 1 [660 nm] | Intensity ratio 1 [405 nm] | Intensity ratio 2 [660 nm] | Intensity ratio 2 [405 nm] |  |
| Example 9 | 0.002 | 0.002 | 3150 | 2700 | 0.9 | 0.7 | 25 |
| Example 10 | 0.023 | 0.020 | 24 | 40 | 0.7 | 0.8 | 25 |
| Example 11 | 0.040 | 0.040 | 4.7 | 7.1 | 0.8 | 0.8 | 25 |
| Example 12 | 0.001 | 0.001 | 1200 | 1700 | 0.6 | 0.5 | 25 |
| Example 13 | 0.028 | 0.034 | 9.2 | 9.3 | 0.5 | 0.5 | 25 |
| Example 14 | 0.005 | 0.003 | 670 | 3300 | 0.4 | 0.3 | 25 |
| Example 15 | 0.083 | 0.094 | 3.1 | 2.0 | 0.4 | 0.2 | 25 |
| Example 16 | 0.023 | 0.020 | 24 | 40 | 0.8 | 0.8 | 25 |
| Comparative Example 3 | 0.125 | 0.151 | 0.8 | 1.2 | 0.08 | 0.07 | 0 |

As shown in Table 3, the sheets for producing a multilayer optical recording medium of Examples 1 to 8 exhibited suitable peel strengths. In contrast, the optical recording layer was broken when the process film was removed in the sheet for producing a multilayer optical recording medium of Comparative Example 1.

As shown in Table 4, the multilayer optical recording media of Example 9 to 16 exhibited great values of Intensity ratio 1, and the light reflected at the interface of the optical recording layer and the pressure sensitive adhesive layer could be easily distinguished. Intensity ratio 2 showed values of 0.2 to 0.9, and the light reflected at the optical recording layers in the deep portion of the optical recording medium could be sufficiently recognized.

INDUSTRIAL APPLICABILITY

The sheet for producing a multilayer optical recording medium of the present invention enables to easily produce the multilayer optical recording medium having an optical recording layer having a thickness of 1,000 nm or smaller and can provide the multilayer optical recording medium exhibiting a sufficiently great intensity of light reflected at deep portions, providing a great recording density and exhibiting excellent property for recording.

What is claimed is:

1. A sheet for producing a multilayer optical recording medium having a repeated structure in which a plurality of optical recording layers are laminated, wherein the sheet has a structure such that a unit comprising at least a release assisting layer, an optical recording layer having a thickness of 10 to 800 nm and a pressure sensitive adhesive layer are disposed on a process film, a release assisting layer is disposed on a surface of the process film, and a pressure sensitive adhesive layer is disposed as an outermost layer, and an absolute value of difference between refractive indices of the release assisting layer and the pressure sensitive adhesive layer at a wavelength of 660 nm is 0.11 or smaller, wherein the release assisting layer is formed directly on the process film.

2. The sheet for producing a multilayer optical recording medium according to claim 1, wherein an absolute value of difference between refractive indices of the release assisting layer and the pressure sensitive adhesive layer at a wavelength of 405 nm is 0.11 or smaller.

3. The sheet for producing a multilayer optical recording medium according to claim 1, wherein a refractive index of the release assisting layer at a wavelength of 660 nm is 1.42 to 1.60.

4. The sheet for producing a multilayer optical recording medium according to claim 1, wherein the unit comprising at least a release assisting layer, an optical recording layer and a pressure sensitive adhesive layer has a structure such that a release assisting layer, an optical recording layer, a release assisting layer, an optical recording layer and a pressure sensitive adhesive layer are successively laminated on a process film.

5. The sheet for producing a multilayer optical recording medium according to claim 3, wherein the unit comprising at least a release assisting layer, an optical recording layer and a pressure sensitive adhesive layer has a structure such that a release assisting layer, an optical recording layer, a release assisting layer, an optical recording layer and a pressure sensitive adhesive layer are successively laminated on a process film.

6. The sheet for producing a multilayer optical recording medium according to claim 1, wherein a material constituting the release assisting layer comprises a cured product of an energy curable compound.

7. The sheet for producing a multilayer optical recording medium according to claim 3, wherein a material constituting the release assisting layer comprises a cured product of an energy curable compound.

8. The sheet for producing a multilayer optical recording medium according to claim 1, wherein a material constituting the release assisting layer comprises a cellulose-based resin.

9. The sheet for producing a multilayer optical recording medium according to claim 3, wherein a material constituting the release assisting layer comprises a cellulose-based resin.

10. The sheet for producing a multilayer optical recording medium according to claim 1, wherein the material constituting the release assisting layer comprises fluorine atom.

11. The sheet for producing a multilayer optical recording medium according to claim 3, wherein the material constituting the release assisting layer comprises fluorine atom.

12. The sheet for producing a multilayer optical recording medium according to claim 1, wherein the optical recording layer comprises a multi-photon absorbing material.

13. The sheet for producing a multilayer optical recording medium according to claim 3, wherein the optical recording layer comprises a multi-photon absorbing material.

14. The sheet for producing a multilayer optical recording medium according to claim 5, wherein a material constituting the release assisting layer comprises a cured product of an energy curable compound.

15. The sheet for producing a multilayer optical recording medium according to claim 5, wherein a material constituting the release assisting layer comprises a cellulose-based resin.

16. The sheet for producing a multilayer optical recording medium according to claim 5, wherein the material constituting the release assisting layer comprises fluorine atom.

17. The sheet for producing a multilayer optical recording medium according to claim 5, wherein the optical recording layer comprises a multi-photon absorbing material.

18. A multilayer optical recording medium comprising a plurality of units, each of the units comprising at least a release assisting layer, an optical recording layer having a thickness of 1 to 1,000 nm and a pressure sensitive adhesive layer, said layers being laminated successively, and the pressure sensitive adhesive layer being disposed as an outermost layer, and an absolute value of difference between refractive indices of the release assisting layer and the pressure sensitive adhesive layer at a wavelength of 660 nm is 0.11 or smaller.

19. The multilayer optical recording medium according to claim 18, wherein said medium comprises from 5 to 100 units of a three layer structure in which the release assisting layer, the optical recording layer and the pressure sensitive adhesive layer are successively laminated or a five layer structure in which the release assisting layer, the optical recording layer, the release assisting layer, the optical recording layer and the pressure sensitive adhesive layer are successively laminated, each of the units being laminated via the pressure sensitive adhesive layer disposed at the outermost side of the unit.

20. The multilayer optical recording medium according to claim 19, wherein said medium is formed by providing a first sheet for producing a multilayer optical recording medium, said first sheet for producing a multilayer optical recording medium comprising the three layer structure disposed on a surface of a process film or the five layer structure disposed on a surface of a process film in a manner such that the release assisting layer is disposed adjacent to the surface of the process film and the pressure sensitive adhesive layer is disposed as an outermost layer in the first sheet for producing a multilayer optical recording medium and a release film is disposed on the surface of the pressure sensitive adhesive layer, removing the release film to provide an exposed surface of said pressure sensitive adhesive layer of the first sheet for producing a multilayer optical recording medium, laminating said first sheet for producing a multilayer optical recording medium and a substrate in a manner such that the exposed pressure sensitive adhesive layer and the substrate face each other to obtain a first laminate, removing the process film of the first sheet for producing a multilayer optical recording medium to provide an exposed surface of said release assisting layer of the first laminate, providing a second sheet for producing a multilayer optical recording medium, said second sheet for producing a multilayer optical recording medium comprising the three layer structure disposed on a surface of a process film or the five layer structure disposed on a surface of a process film in a manner such that the release assisting layer is disposed adjacent to the surface of the process film and the pressure sensitive adhesive layer is disposed as an outermost layer in the second sheet for producing a multilayer optical recording medium and a release film is disposed on the surface of the pressure sensitive adhesive layer, removing the release film disposed on the surface of the pressure sensitive adhesive layer of the second sheet for producing a multilayer optical recording medium to provide an exposed surface of said pressure sensitive adhesive layer, laminating said second sheet for producing a multilayer optical recording medium and the first laminate in a manner such that the exposed pressure sensitive adhesive layer of the second sheet for producing a multilayer optical recording medium and the exposed surface of said release assisting layer of the first laminate face each other to obtain a second laminate, removing the process film of the second laminate to provide an exposed surface of said release assisting layer of the second laminate, and repeating the above procedures successively to obtain the multilayer optical recording medium.

* * * * *